Figure 6:
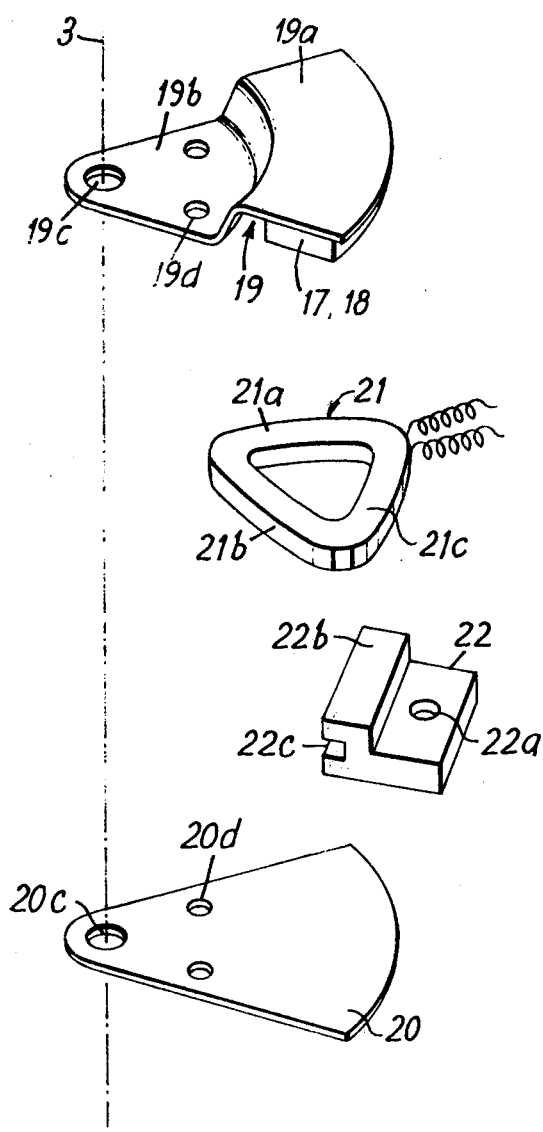

United States Patent [19]

Wren

[11] 4,143,879
[45] * Mar. 13, 1979

[54] DISC-RECORD PLAYERS

[75] Inventor: John P. Wren, Swindon, England

[73] Assignee: Plessey Handel und Investments AG, Zug, Switzerland

[*] Notice: The portion of the term of this patent subsequent to Feb. 28, 1995, has been disclaimed.

[21] Appl. No.: 840,366

[22] Filed: Oct. 7, 1977

Related U.S. Application Data

[63] Continuation-in-part of Ser. No. 736,222, Oct. 27, 1976, Pat. No. 4,076,258.

[30] Foreign Application Priority Data

Oct. 11, 1976 [GB] United Kingdom ............... 42212/76

[51] Int. Cl.$^2$ .............................................. G11B 3/10
[52] U.S. Cl. .................................................. 274/23 R
[58] Field of Search ...................................... 274/23 R

[56] References Cited

U.S. PATENT DOCUMENTS

| | | | |
|---|---|---|---|
| 3,292,935 | 12/1966 | Cooper | 274/23 R |
| 3,503,615 | 3/1970 | Matsuda | 274/10 R |
| 3,731,938 | 5/1973 | Wren | 274/23 R |
| 3,779,563 | 12/1973 | Irisana | 274/23 R |
| 4,076,258 | 2/1978 | Wren | 274/23 R |

FOREIGN PATENT DOCUMENTS 2354530 10/1974 Fed. Rep. of Germany ........ 274/23 R

Primary Examiner—Steven L. Stephan
Attorney, Agent, or Firm—Fleit & Jacobson

[57] ABSTRACT

An anti-skating and/or arm-moving device for a disc-record player comprises two permanent-magnet plates carried by the pickup-arm support and each extending over a sector of a circle round the same, the plates being magnetized, each across its thickness, with opposite polarities to produce each a magnetic flux at right angles to the direction of plate movement, and a coil fixed to the player structure in which two conductor elements extend across the flux of each magnet plate respectively, transversely to the direction of magnet movement, and carry the coil current in opposite directions.

Current cut-off means are preferably provided for cutting off the anti-bias current in the winding when, particularly during a manual cueing operation, the pickup stylus is lifted from the record surface, and conversely preventing the application of arm-moving current when the stylus rests on a record.

15 Claims, 11 Drawing Figures

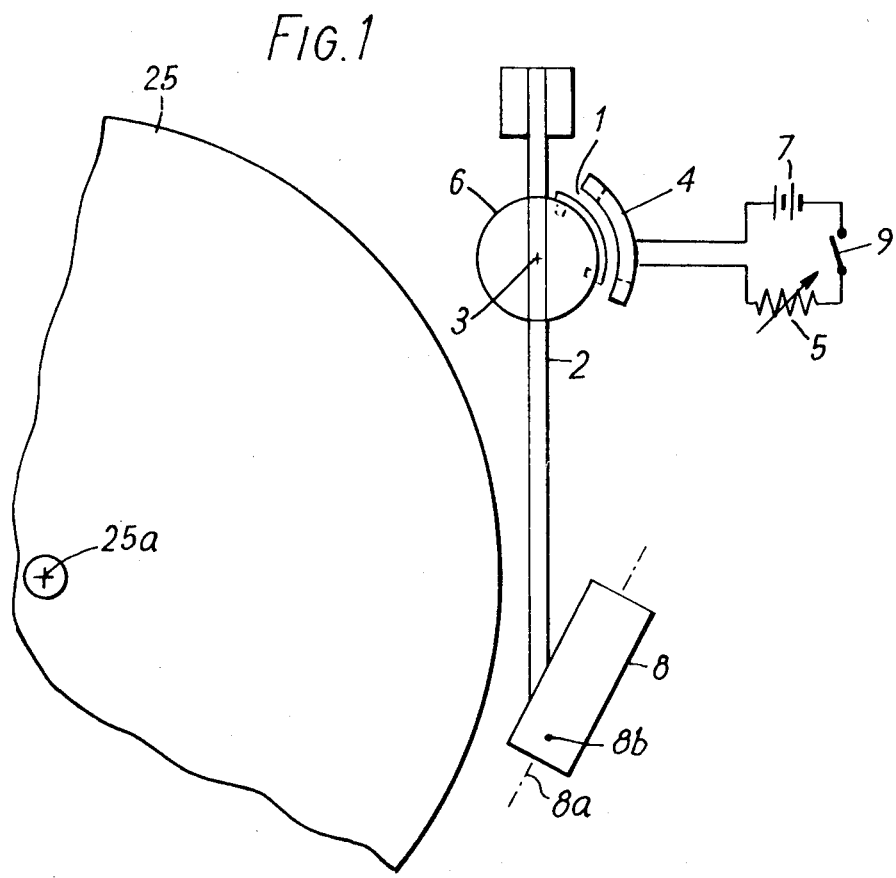
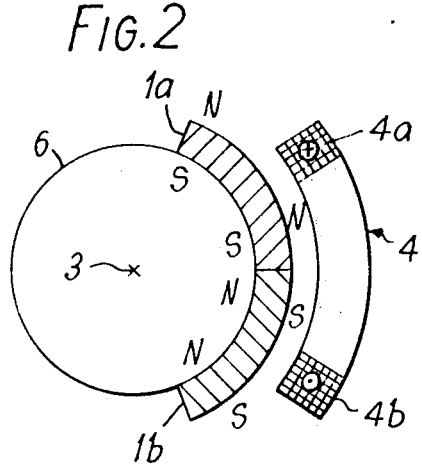
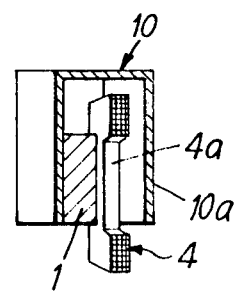

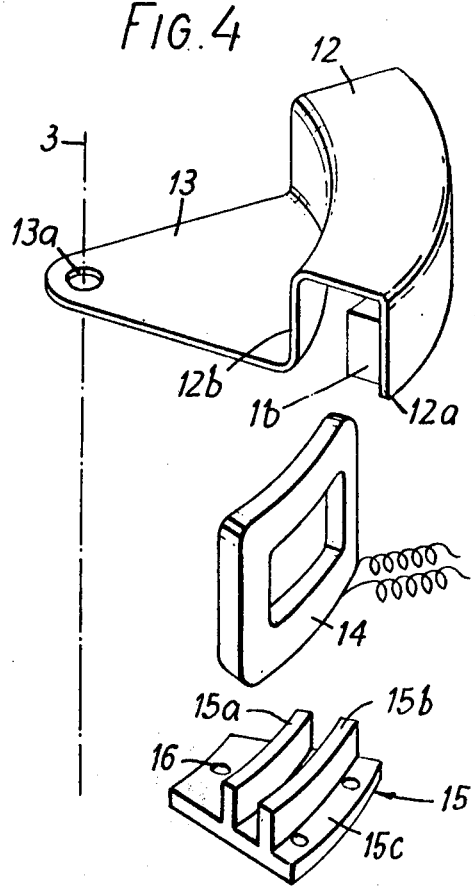
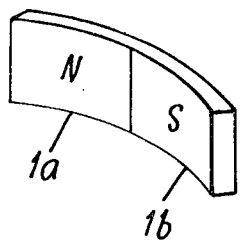
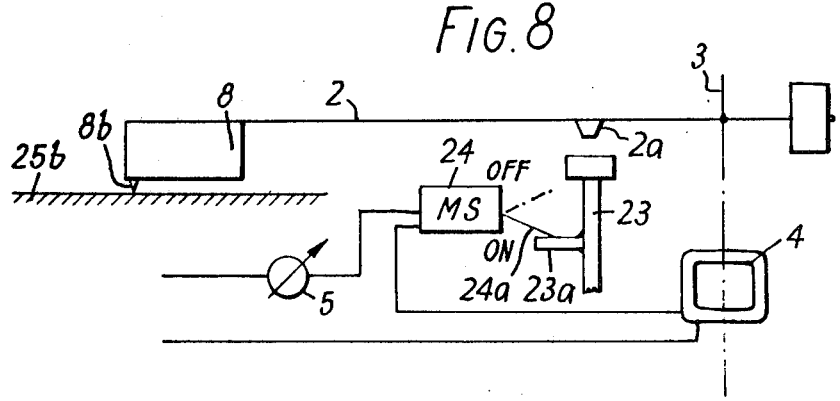

DISC-RECORD PLAYERS

This application is a continuation-in-part of my application Ser. No. 736,222, filed Oct. 27, 1976, U.S. Pat. No. 4,076,258.

This invention relates to disc-record players of the kind in which the playing groove of the record is scanned by a stylus carried on a pickup arm which is mounted on an arm support movable in the player for joint pivotal movement with the arm about a vertical axis. The term record player, throughout the present specification is intended to be broad enough to include record changers. The invention has for an object to provide improved means for applying to the pickup-arm support a torque about this vertical axis. Another object is to provide improved electrodynamic means suitable for producing movement of the pickup arm about the above-mentioned vertical axis, more particularly for moving the arm away from the turntable centre after termination of the play of the record and moving the arm towards the turntable centre to a point at which play is to commence. A still further object is to provide such electric or dynamic means which are additionally suitable for providing compensation for the so-called skating force, that is to say for that component of the frictional force that acts upon the stylus at its point of contact with the record due to the rotation of the latter, which acts at right angles to the radius connecting the contact point of the stylus with the said vertical axis.

A further object is to provide such improved electrodynamic means which when energized with anti-skating electric direct current of a predetermined or preset constant value, will produce an anti-skating torque of substantially constant value throughout the range of operative arm movement.

The device of the present invention essentially comprises a permanent magnet means secured on the arm support to produce in an air space extending over an arc of a circle about said vertical axis, whose angle is at least substantially equal to the angle of operative arm movement about the said vertical axis a magnetic flux substantially normal to the tangental direction of the said circle and of a strength substantially uniform over said angle, and a winding member held stationary in the player and comprising a winding having conductor portions which extend through said air space in a direction substantially normal to the direction of the flux and to the tangential velocity of the most closely adjacent surface element of the magnet means.

Various means for effecting compensation of the skating force have previously been proposed, including mechanical means, for example a spring, or a system of two co-operating magnets, one fixed in the player and the other rotating with the arm, but the device according to the present invention when used as an anti-skating device has a number of advantages over these existing compensation means, for example in that the magnitude of the compensation force or torque can be readily adjusted by controlling the current applied to the winding; that the control knob or the like may be placed at any convenient point of the record player unit, thus avoiding the inconvenience and risk involved in having to operate control means in close proximity to the delicate arm pivot; and a further advantage is that the bias force may be completely suppressed by opening the electric circuit for the energization of the winding, thus facilitating accurate setting up of the stylus force and also avoiding so-called stylus drift which during cueing operations would be produced by the application of bias-compensation torque before the stylus makes contact with the record, that is to say when there is no skating force.

Preferably the magnet means comprise two permanent magnet elements, formed as sectors of an annular disc or of a cylindrical sleeve and arranged, preferably in abutting relation, to cover two sectors, each magnetized across its thickness but in opposite directions to each other, in conjunction with a yoke member for the magnetic flux, which forms with one of the surfaces of each sector element an air gap in which conductors of the winding is arranged to move relative to the magnet means, each turn of the winding being arranged to provide two portions in whose conductors current will flow across the gap, in a direction at right angles to both the direction of the magnet flux and to the direction of the relative movement of the magnet means and the winding, the two winding portions being arranged to pass through the air gap within the flux emitted by the two sector elements respectively, with the current in said two portions flowing in opposite directions, so that both these winding portions will produce torque in the same direction. Bearing in mind that the total movement of the pickup arm between its rest position and the position which is assumes when playing the innermost turn of the playing groove of a record, is only between 35° and 50°, there will be no practical difficulty in ensuring that during this movement each winding portion will remain well within the flux from its associated sector element of the magnet means thus ensuring the production of a torque which will be substantially constant throughout the movement of the pickup arm.

The flux may be arranged radially with the permanent-magnet elements formed as sectors of a cylinder round the arm-pivot axis, or alternatively an axial magnetic flux may be employed with the use of flat magnet elements in the shape of sectors of an annular disc.

When the device according to the invention is arranged to produce, in a disc-record player having a turntable rotatably mounted in the player for supporting a record to be played, and a pickup arm arranged to carry a pickup equipped with a stylus for playing such record and mounted in the player for pivotal movement about a pivot axis that is parallel to the turntable axis, to move the stylus across a record on the turntable, and for up-and-down movement of the arm out of and into engagement of the stylus with such record, pivotal movement of the pickup arm about said pivot axis the device includes, for this purpose, an electric circuit means incorporating said winding, switch means forming part of said circuit means and operable, when said circuit means are connected to a source of direct current, to selectively pass, when the pickup arm is in such raised position, motor current from such source through said winding selectively in one or the other of two opposite directions and at such strength as to produce, by its electrodynamic co-operation with the flux from the said pole faces, a torque about the vertical axis of pivotal arm movement of such magnitude as to move the pickup arm about the said vertical axis in one or the other direction according to the selected direction of the current, the device also including damping means for controlling the speed of such movement.

The circuit means preferably also include anti-bias switch means operable to pass, when the pickup stylus rests on a record, through the said winding instead of such arm-moving current a current of such direction and strength as to produce, in co-operation with the flux of the magnet means, a torque about the said pivot axis tending to move the pickup arm away from the turntable centre and substantially equal to the oppositely directed torque exerted upon the pickup arm by the product of the friction force acting upon the stylus and equal to the product of the friction force acting upon the stylus due to the movement of the record surface at its point of contact and the distance of this line of action from the pivot axis of the pickup arm.

Thus one and the same combination of magnet means and winding will serve, in conjunction with suitable electric circuit means, the dual purpose of providing compensation for the so-called skating force when the stylus is in contact with the playing groove of a record, and of moving the pickup arm towards and away from the turntable axis when the stylus is raised clear of the record surface, for example in order to return the pickup arm to its rest position clear of the circumference of the record after the play of a record, and to move the arm towards the turntable axis up to a desired cueing position. Such inward movement may be terminated simply by switching off the current in the induction means, either manually, more particularly during a manual cueing operation, or by a stop whose position may, in a manner well known to those skilled in the art, be manually pre-set or automatically preselected according to the size of the record or records to be played. This combination of features is believed to lend itself to incorporation in a simplified construction of record changer. The setting of the selected stop may, if desired, be effected electro-magnetically.

The movement of the usual arm-lifting mechanism to raise the arm and to deposit it on to a record, may be utilised to ensure that the device can be operated to produce arm movement towards or away from the turntable centre only when the arm is in a raised position with the stylus clear of the record, and this feature may be combined with means which ensure that the torque which is provided for balancing the skating force, is operative when the stylus is in contact with a record being played.

Figure 7:
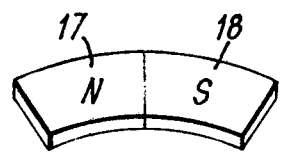
Figure 9:
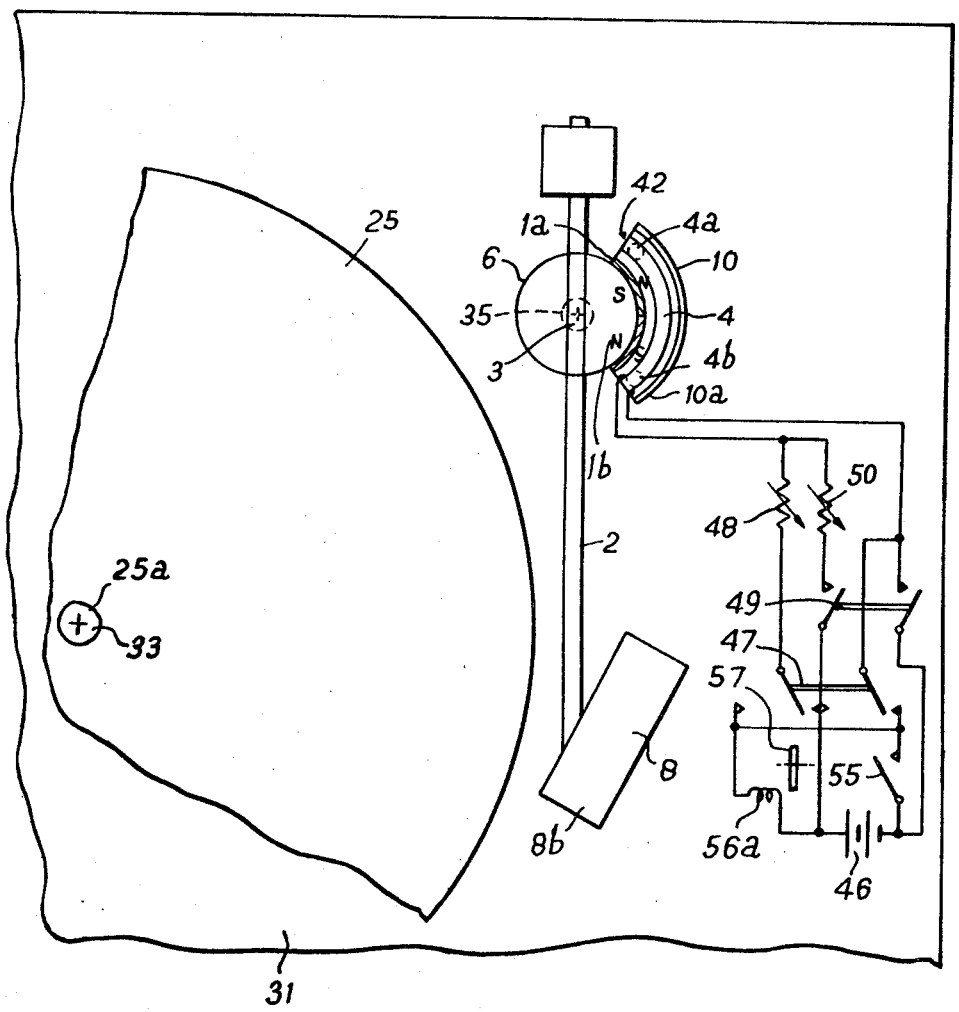
Figure 10:
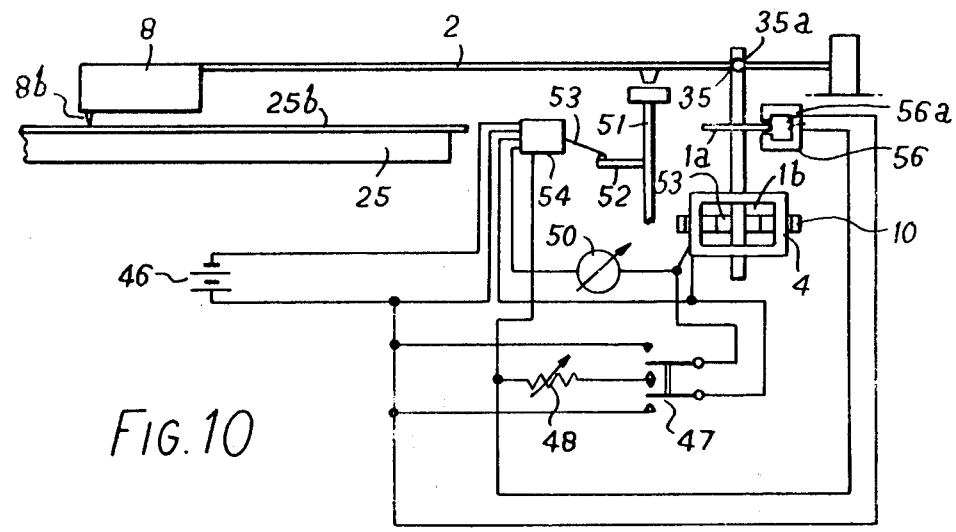
Figure 11:
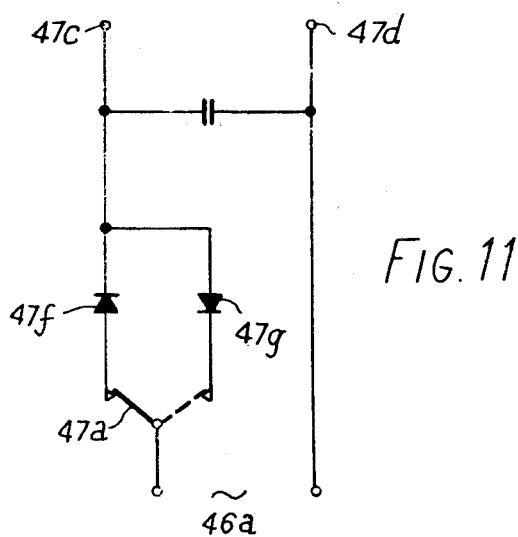

Further objects and features of various forms of devices embodying the present invention will become apparent from the following description with reference to the accompanying drawings, in which FIG. 1 is a somewhat diagrammatic view on part of the unit-plate assembly of a gramophone record player and shows the pickup arm and also somewhat diagrammatically one form of a device according to the present invention including electric circuit means for use as an anti-skating device, FIG. 2 is a sectional plan view showing, to a larger scale, the permanent magnet element means and the coil constituting the winding of this embodiment, FIG. 3 is a radial section of the permanent magnet means and coil, in which the permanent magnet means is equipped with a yoke portion for the flux-return path, thus providing an annular air gap which is crossed by the flux from the flux emitting surface of the magnet to a complementary surface provided by the yoke portion, FIG. 4 is an exploded perspective view of an embodiment of the device according to the invention which employs a magnetic flux disposed radially relative to the vertical arm-pivot axis, FIG. 5 is a perspective view showing the magnet elements employed in the permanent magnet means of this embodiment, FIG. 6 is an exploded perspective view of a preferred embodiment of the device according to the invention which employs a magnetic flux disposed in an axial direction relative to the vertical arm-pivot axis, FIG. 7 is a perspective view of the magnet elements of this embodiment, FIG. 8 is a diagrammatic side elevation showing the pickup arm together with a portion of the arm-lifting mechanism and a record being played, and also shows diagrammatically the arrangement of a switch in the electric circuit for the winding of a device according to the invention which automatically ensures that the anti-skating current through the the winding is cut off when the pickup arm is lifted by the arm-lifting pin during a cueing operation, FIG. 9 is a view similar to that of FIG. 1, in which the energizing circuit for the winding is modified to provide for the control of electrodynamic movement of the pickup arm, FIG. 10 is a diagrammatic elevation of an embodiment incorporating means for automatically controlling the changeover between arm-displacement operation effective when the arm is raised, and skating-force balancing operation, effective when the arm is in its playing position with the stylus in contact with a record, and FIG. 11 illustrates an alternative for the current-reversing switch arrangement of FIG. 9.

Referring now first to FIGS. 1 and 2, the pickup arm 2 of a disc-record player, which may be arranged for manual, semi-automatic, or fully automatic playing of a record or a succession of records, is, in a conventional manner, mounted in an arm support arranged for movement in the player about a vertical axis 3 to permit the arm to be moved to a desired starting point and then to follow the record groove on a disc record, and also to be moved outwardly of the record to a position of rest. The arm carries a pickup head 8, which is fitted with a cartridge arranged along an axis 8a and having a stylus 8b for engagement of the record groove. As shown in the illustration, the axis 8a of the pickup head 8 and cartridge is arranged at an angle to the pickup arm 2 in order to ensure that during the play the axis 8a approximately corresponds to the tangential direction of the record groove at a point at which it is engaged by the stylus 8b, and it will be readily appreciated that, since the frictional force between the record and the stylus extends substantially in the direction of the axis 8a, it will exert upon the pickup arm 2 a torque about a vertical axis 3 which is substantially equal to the product of the radial distance of the stylus 8b from the arm-pivot axis 3 multiplied by that component of the friction force acting upon the stylus 8b which acts at right angles to the said radialdistance, and as is generally known, this torque tends to move the arm towards the centre of the turntable.

In order to compensate for the effect of this torque, or if desired to permit the arm to be moved electrodynamically or both, a permanent-magnet means 1 comprising two elements 1a and 1b in the form of adjacent sectors of a cylindrical sleeve, is secured to drum 6 fixed on the arm support constituted by the pickup-arm spindle, coaxially with the vertical pivot axis 3, so as to move round that axis jointly with the pickup arm 2. Both elements 1a and 1b are permanently magnetized in the radial direction in such a manner that the North pole of the one element, for example of element 1a, is at its outer cylinder surface while the North pole of the other element is at its inner surface, as indicated by N and S in FIG. 2, and each extends over an angle sufficient to cover the total operative movement of the pickup arm. A winding in the form of a coil 4 which is curved according to a cylinder coaxial with that of the magnet elements 1a and 1b, is secured to the stationary part of the record-player structure and is arranged to be energised with direct current from any suitable source, indicated as a battery 7, through an anti-skating circuit which includes an adjustable resistor 5 and an on-off switch 9. The coil 4 is so arranged that two portions 4a and 4b of it, which preferably are substantially rectilinear, and in which the current flows substantially parallel to the axis 3, are respectively placed in the radial field emitted by the two permanent magnet elements 1a and 1b. Since, when the on-off switch 9 is closed to energize the coil, current will flow through the two portions 4a and 4b in opposite directions, and these two portions are also arranged in parts of the field of the permanent-magnet member in which the radial directions of the flux are opposite to each other, both elements 4a and 4b will contribute to a torque about the pivot axis 3 in one and the same direction, which is arranged to be such as to tend to move the arm 2 away from the centre of the record, i.e. opposite to the torque exerted by the skating force, and by adjustment of the variable resistor 8, the torque exerted by the device can be made equal to the above-mentioned skating torque.

It will also be observed that, while in all mechanical skating-force compensators of which we are aware, the provision of the compensator will produce a tendency for the pickup arm to move outwardly when the arm has been set to a cueing position, (so-called cueing drift) due to the presence of the compensator torque in the absence of a skating torque, the present invention offers the possibility of eliminating such interference with cueing procedure by simply opening the switch 9 until the stylus rests on the record.

In practice the arrangement as so far described with reference to FIGS. 1 and 2 suffers from the drawback that the flux path of the flux passing through the conductors of the winding coil from one pole of a permanent-magnet element has to traverse a long distance through air to establish a closed path to the other pole, and that therefore a relatively strong magnet is required for producing a given strength of effective flux, and for this reason the permanent-magnet means comprises, as illustrated in FIG. 3, a yoke member 10 which extends from that surface of the permanent magnet elements which faces away from the winding 4, round the edge of the winding coil 4 to provide a complementary pole face 10a which faces the opposite surface of the permanent-magnet elements 1 across an air gap, in which the portions 4a and 4b of the winding 4 are accommodated.

A practical form of the magnet structure and the winding structure of an arrangement as described with reference to FIGS. 1 to 3 is illustrated in FIGS. 4 and 5, in which the yoke structure is constituted by a member 12 pressed in mild steel, with the yoke in the shape of an inverted U-channel curved to form a sector of an annulus about the arm-pivot axis 3 and formed integral with a flat, sector-shaped portion 13 which has a bore 38 extending along the axis 3 for centering the member 12 on the pickup-arm support spindle of a disc record player. The permanent-magnet elements 1a and 1b are secured, inside the channel, to the outer wall 12a of the U-channel in order to accommodate a maximum circumferential length of magnet. The winding is formed as a coil 14 wound in substantially rectangular shape but curved cylindrically in accordance with mean curvature of the air gap formed between the inner wall 12b of the channel 12 and the inner surface of the magnet elements 1a, 1b. This coil is mounted between two similarly curved ribs 15a and 15b extending from a plate-like base 15c of a coil holder 15. The base 15c is provided with bores 16, through which screws may be passed for attaching the coil holder to the fixed structure of the record player.

FIGS. 6 and 7 similarly illustrate a preferred construction of the magnet means and the winding of an arrangement employing a magnetic flux in the direction of the axis 3. The permanent-magnet means comprise two flat permanent-magnet plates 17 and 18, which are formed as plates shaped and arranged as adjacent sectors of a flat ring, coaxial with the arm-pivot axis 3 and magnetized across their thickness with opposite polarities. These magnet plates 17 and 18 are secured to the underside of a part-annular flange 19a formed of mild steel and integral with, but axially offset relative to, a flat centering portion 19b which jointly with it forms a yoke element 19, and which is provided with a centering bore 19c fitting round the pickup-arm support spindle of a record player, and with two fixing bores 19d. A further yoke element 20, also of mild steel, and of similar general outline but flat, is similarly provided with a centering bore 20c and with fixing and locating bores 20d, all of which are arranged to be aligned with the bores 19c and 19d respectively of yoke element 19. The two yoke elements 19 and 20 are arranged with their outlines aligned in the direction of the axis 3, and the amount of axial offset of the annular portion 19a relative to the attachment portion 19b of element 19 is so dimensioned as to leave, when the element 20 is in surface contact with the portion 19b of the element 19, an air gap between the free surface of the magnet elements 17, 18 and the adjacent surface of the plate-like element 20, which is sufficient to accommodate the thickness of a winding constituted by a coil 21. The latter has a flat, near-triangular shape to provide two conductor portions 21a and 21b and a connecting portion 21c formed approximately as a sector of flat ring, and a coil holder 22 is provided, which can be secured to the stationary portion of the record player by a screw extending through a bore 22a. The coil holder 22 is formed as a plate with a side portion 22b which is formed with a lateral groove 22c for holding engagement with the outer edge of the connecting portion 21c of the coil 21, whereby the coil 21 is held in such a position that its conductor portions 21a and 21b extend substantially radially relative to the axis 3 of the pivot-arm spindle.

An arrangement such as that described with reference to FIGS. 6 and 7, in which a magnetic flux in the direction of the spindle axis 3 is employed, offers the advantage over an arrangement such as that described with FIGS. 4 to 5, in which a radial flux is employed, that it avoids the need for making a coil whose turns are arranged in a cylindrically curved surface.

Both the embodiments described respectively with reference to FIGS. 4 and 5 and to FIGS. 6 and 7 may be modified in detail without exceeding the scope of the general principle of the invention as claimed in the appended claims; in particular, while in the embodiments described the two permanent-magnet elements are arranged to form abutting sectors of a circular configuration, these two elements may be spaced from each other along such circle, thereby improving the quality of the magnetic flux in the vicinity of the adjacent ends, but at the cost of a decrease in compactness of the arrangement.

Referring now more particularly to the electric circuit for the energization of the winding with anti-skating current, it is believed advantageous to ensure automatic interruption of current flow when the pickup arm is lifted off the record, more particularly in automatic or semi-automatic record players. FIG. 8 illustrates an arrangement in which this is achieved. The energization and de-energization of the winding 4 is controlled by the movement of a pickup-lifting pin 23 which is normally provided in automatic and semi-automatic record players and in record players equipped with a so-called cueing device. In the arrangement of FIG. 8, the energisation circuit for the winding 4 incorporates, in addition to the current-adjustment resistor 5, a microswitch 24, which is spring-biassed to its closed position and has an operating member 24a, while the arm-lifting pin 23 has a platform-forming spur 23a, on which the operating element 24a of the microswitch rests. The relative position of the microswitch and this platform is so determined that the switch is closed when the spur 23a is in its lowermost position, but will open when the lifting pin 23 is raised to reach a height at which it makes contact with an abutment 2a of the pickup arm 2 to raise the latter from the position illustrated in the Figure, in which the stylus 8b of the pickup 8 rests on a record 25b which has been placed on the turntable 25 of the record player; during downward movement of the lifting pin 23, the microswitch is arranged to close its contact only when the pin 23 has moved a certain distance below the point at which the stylus 8b makes contact with the record, thus preventing the device from exerting an outwardly acting force on the pickup arm before the stylus has engaged the record groove.

The arrangements of the permanent magnet means as described above with reference to various examples will produce a torque which is substantially constant over the angle of arm movement. If so desired, however, this torque may be arranged to undergo slight variations as a function of the angular position of the pickup arm in order to match the slight variations of the skating torque which are due to the fact that during the movement of the stylus across a record the angle between the skating force, i.e. the tangential direction of the record movement at the point of contact, and the radius connecting the pickup stylus with the vertical arm-pivot axis varies with radius. This can be achieved by so arranging or shaping, or arranging and shaping, the gap-forming surface of the yoke as to cause the flux across the gap to vary along the gap appropriately in its intensity and/or its area of action, by variation of the width of the gap and/or the width of the pole-forming area in the direction of relative movement of the winding.

A similar result may also be achieved by suitably arranging the shape and positioning of the magnet 1 in relation to the winding, more particularly in cases in which no yoke is provided.

Furthermore, as an alternative, or in addition, to the provision of the cut-off switch 9, the variable resistor 5 may be arranged to have an open-circuited end position.

Referring now to FIGS. 9 and 10, in which the same references as in FIGS. 1 to 8 have been used for corresponding parts, the turntable 25, with which the pickup arm 2 is to co-operate, is rotatable about a centre spindle 33 extending, along the axis 3, from a unit plate 31, its direction being vertical when the player is in use. The pickup 2 is carried by the turntable spindle 35 in such a manner as to be also capable of movement relative to the spindle 35 about a horizontal axis 35a extending transversely to the length of the arm, as shown in FIG. 10, to enable the pickup 8 with its stylus 8b to be lifted off the surface of a record 25b resting on the turntable or to follow any minor up and down movement of the record surface when the stylus 8b rests on the record.

In order to permit the pickup arm 2 to be moved electrodynamically about the axis 3 of the spindle 33 for movement of its pickup 8 towards and away from the record centre, a magnet member constituted by a pair of part-cylindrical magnet plates 1a and 1b is secured coaxially to the spindle 33 by a supporting drum 6. Both plates are permanently magnetized in a radial direction, but their respective direction of magnetization is opposite, the plate 1a having a north pole at the radially outer side and a south pole at the inner side, while the plate 1b has a south pole at the outer side and a north pole at the inner side. A yoke member 10 of U-profile co-operates with the magnets 1a and 1b to provide a return path for the flux emitted by their respective outer faces to the respective inner faces of these magnets, thus providing, in the intervening air gap 42, areas of high flux density, in which the flux is substantially radial and reasonably uniform except for the vicinity of the zone of abutment of the two magnets 1a and 1b. A winding coil 4 whose turns are substantially rectangular in a surface is curved in substantial conformity with the curved air-gap 42 formed between the magnets 1a, 1b and the outer leg of the yoke 10, is fixed to the unit plate 41 in such a manner that two conductor portions 4a and 4b extend, within the air gap 42 respectively across the flux paths of the two magnets 1a and 1b. The current in the two conductor portions 4a and 4b will flow in opposite axial directions, the direction having been assumed in the drawing to be upwardly from the unit plate 41 in conductor member 4a and downwardly towards the unit plate in conductor member 4b. Since, due to the opposite polarization of the two magnets, the respective directions of the magnetic flux passing through the conductor members 4a and 4b are also opposite to each other, it follows that when unidirectional current flows through the coil winding 4, the co-operation of the current with the magnetic flux will produce at both conductor portions 4a and 4b a circumferential force, and thus a torque about the axis 3 of the spindle 33, of the same direction, namely a torque tending to produce a pivotal movement of the pickup arm either towards or away from the turntable centre according to the direction of current flow. Such current flow is produced by suitably applying the coil 4 to a d.c. voltage source 46, which has been shown as a battery but is in practice likely to generally be a voltage source derived, via suitable voltage-reducing and rectifying means, from an a.c. mains supply employed for energization of a turntable drive motor. To produce movement of the pickup arm 2 in one direction or the other about the axis 3, a two-pole reversing switch 47 is moved to one or the other of its two end positions, thereby respectively closing circuits for supplying the winding coil 4 with current in two opposite directions through a path including in each case a suitably preset adjustable resistor 48. A second two-pole switch 49, arranged to be open when the switch 47 is put into one of its operating positions, can be closed when the pickup stylus rests on the surface of a record 25b on the turntable 25, in order to provide compensation for the above-explained skating force. When this switch 49 is closed, it completes a circuit which includes a second adjustable resistor 50, and it will pass through the winding 4 a current which tends to move the pickup arm 2 away from the turntable centre 25a with a force which is less than that applied when displacement of the pickup arm is effected by energization of one of the circuits controlled by the switch 47, and the effective resistance of the adjustable resistor 50 is set to a value at which the torque applied electrodynamically to the pickup arm 2 balances the torque produced by the so-called skating force. A switch 55 is interposed in the line connecting one terminal of the d.c. source 46 to the reversing switch 47. This switch 55 is interlocked with the two-pole switch 49 so that only one of the switches 49 and 55 can be closed at any one time, thus ensuring that the winding 4 cannot be energized simultaneously both via the movement-control resistor 48 and via the bias-compensating resistor 50.

The arrangement illustrated in FIG. 10 includes an arm-lifting pin 51, which in a customary manner serves for lifting the pickup from the record surface when the pickup arm is to be moved across the turntable otherwise than by the guiding action of the record groove exerted on the stylus 8b during the play of a record. The movement of this pin 51 is utilised to ensure that the anti-skating torque is applied to the pickup arm when, and only when, the pickup stylus rests on the surface of a record 25b and becomes operative with a slight delay after the moment of deposition of the pickup arm, and on the other hand to ensure that application of the arm-moving torque under the control of the change-over switch 47 can only become effective when the pickup has been lifted off the record surface. For this purpose the pickup-lifting pin 51 has a projection 52 co-operating with the spring-loaded actuating element 53 of a two-pole microswitch 54. This microswitch incorporates the two switches 49 and 55 of FIG. 9 and is arranged to close the switch 49 when the actuating element 53 is in the illustrated position, which corresponds to the lowermost position of the arm-lifting pin 51, and which the pin reaches after contact between the stylus 8b and a record being played has been established. Switch 55 is open at this position of the arm 2; it will close when the lifting pin 51 has been raised sufficiently to ensure that the stylus 8b is clear of the surface of any record 25b resting on the turntable 25, while the switch 49 is arranged to be open at this position of the arm 2. A damping electro-magnet 56, co-operating with a disc 57 of electrically conductive material, arranged for rotation with the arm spindle 35 is arranged to be likewise cntrolled by the switch 55 so that the winding 56a of this electromagnet is energized to produce an eddy-current damping action whenever the switch 55 is closed.

It should be appreciated that the arrangements of FIGS. 9 and 10 have been described by way of example only and that, for example, the eddy-current damping device described with reference to FIG. 10 may be replaced by a suitable viscosity damping device. Furthermore the form of the electro-dynamic torque-producing means may be varied from the constructions shown somewhat diagrammatically in FIGS. 9 and 10 and may, for example, be constructed as described hereinabove with reference to FIGS. 4 and 5, or to FIGS. 6 and 7.

It will also be readily appreciated that, while the actuation of the arm-lifting pin 57 to raise and lower the pickup arm may be effected mechanically, the raising and lowering of the arm may alternatively be effected electromagnetically or electrodynamically and that the damping during the deposition may be effected by mechanical, hydromechanical, or electrical means.

Furthermore, instead of providing a reversing switch 49 connected to a d.c. supply, a simple change-over switch 47a may, as indicated in FIG. 11, be arranged to selectively connect an a.c. supply 46a to a pair of input terminals 47c, 47d via one or the other of two rectifier systems 47f, 47g to respectively supply to these terminals 47c, 47d d.c. current of two opposite polarities.

What I claim is:

1. A device for applying to a phonograph pickup arm mounted on an arm support arranged for joint pivotal movement about a vertical axis relative to a base member torque about said axis, which comprises: a permanent magnet means mounted for joint movement with the arm support about said axis and constructed and magnetized to provide two pole faces of opposite polarities, angularly spaced about said axis, both arranged substantially in a common surface of revolution about said vertical axis with each said pole face extending over an angle about said axis with the two pole faces angularly spaced about said axis and at least equal to the angle of operative movement of the pickup arm about said axis, said magnetic means being magnetized to produce magnetic flux at right angles to each pole face; a winding of conductor wire, mounted to be stationary relative to said base member and having two portions arranged in close proximity to said pole face, said two portions being arranged for respective electrodynamic co-operation with the flux from each of said pole faces; and yoke means of magnetizable material which are mounted for joint movement with said magnet means and arranged to provide a yoke surface facing each said pole surface at such a distance therefrom as to provide a gap sufficient to accommodate said winding portions and form a low-reluctance magnetic current for the magnetix flux that extends between each pole face and the yoke surface facing such pole face, the lengths of conductor wire in each said portion extending substantially parallel to said surface of revolution and transversely to the velocity vector of that element of said surface which directly faces the respective portion, said winding portions being electrically connected in series in such manner that when the winding is energized, the electric current flow in each of said winding portions produces, with the magnet flux passing said portion from the magnet means, torque about said axis in the same direction.

2. A device for applying, to a phonograph pickup arm mounted on an arm support arranged for joint pivotal movement about a vertical axis relative to a base member, torque about said axis said phonograph pickup arm also being mounted for vertical movement between a playing position and a raised position, said device comprising a permanent magnet means mounted for joint movement with the arm support about said axis and constructed and magnetized to provide two pole faces of opposite polarities, angularly spaced about said axis, both arranged substantially in a common surface of revolution about said vertical axis with each said pole face extending over an angle about said axis at least equal to the angle of operative movement of the pickup arm about said axis with the two pole faces angularly spaced about said axis, said magnetic means being magnetized to produce magnetic flux at right angles to each pole face; a winding of conductor wire, mounted to be stationary relative to said base member and having two portions arranged in close proximity to said pole faces, said two portions being arranged for respective electrodynamic co-operation with the flux from each of said pole faces, yoke means of magnetizable material which are mounted for joint movement with said magnet means and arranged to provide a yoke surface facing each said pole surface at such a distance therefrom as to provide a gap sufficient to accommodate said winding portions and form a low-reluctance magnetic circuit for the magnetix flux that extends between each pole face and the yoke surface facing such pole face, the lengths of conductor wire in each said portion extending substantially parallel to said surface of revolution and transversely to the velocity vector of that element of said surface which directly faces the respective portion, said winding portions being electrically connected in series in such manner that when the winding is energized, the electric current flow in each of said winding portions produces, with the magnet flux passing said portion from the magnet means, torque about said axis in the same direction; electric circuit means incorporating said winding, switch means forming part of said circuit means and operable, when said circuit means are connected to a suitable source of direct current, to selectively pass, when the pickup arm is in such raised position, motor current from such source through said winding selectively in one or other of two opposite directions and at such strength as to produce, by its electrodynamic co-operation with the flux from the said pole faces, a torque about the said vertical axis in one or other direction according to the selected direction of the current, the device also including damping means for controlling the speed of such movement.

3. A device as claimed in claim 2 which also includes an electric anti-skating circuit including the winding of the device and arranged to pass when connected to a suitable voltage source, anti-skating direct current through the winding in such direction and of such magnitude as to produce an anti-skating torque which urges the pickup arm towards the turntable centre, to oppose the skating force due to angular action of the friction force of the record surface upon the stylus of the pickup arm.

4. A device as claimed in claim 3 which includes adjustable control means for the anti-skating current flowing through the said winding so as to permit matching of the anti-skating torque produced by the device to the skating torque.

5. A device as claimed in claim 3 wherein said anti-skating circuit includes a switch operable to cut-off the flow of current through said winding.

6. A device as claimed in claim 3 for a record player having pickup-arm-lifting means operable to engage the pickup arm to lift the same above the surface of a record to be played, wherein the electric circuit includes a switch opened by said record-lifting means to cut-off the flow of anti-skating current through said winding when the said arm-lifting means are in engagement with the pickup arm.

7. A device as claimed in claim 6 which includes delay means causing the cut-off means to remain operative to cut-off the current flow during a delay period after cessation of engagement of the arm by said arm-lifting means.

8. A device as claimed in claim 2, wherein the magnet means comprise two plate elements forming angularly offset portions of a plane ring coaxial with that vertical axis, said elements being magnetized in the direction of said axis with respectively opposite polarities, said two winding portions being substantially rectilinear and extending respectively in radial directions relative to said vertical axis which are angularly offset about this axis in accordance with the angle by which said plate elements are mutually offset, the ends of said portions being respectively interconnected substantially inside the inner radius and substantially outside the outer radius of said plane ring.

9. A device as claimed in claim 8, wherein said plate elements are secured each at one of its faces, on a first magnetizable yoke plate extending radially from the arm support, and a second magnetizable yoke plate of similar outline is arranged to so face the other face of each plate element as to form between each said other face and said second yoke plate a gap in which said winding portions are respectively accommodated, said second yoke plate being in magnetically conducting contact with said first yoke plate in a zone adjacent to said vertical axis and clear of the faces of the plate elements.

10. A device as claimed in claim 2, wherein the permanent magnet means comprise two plate elements which are cylindrically curved transversely to their major surfaces and so arranged as to both form portions of a single cylindrical sleeve about said vertical axis which are angularly offset relative to each other about said axis, said elements being each magnetized across its radial thickness with respectively opposite polarities, said two winding portions being substantially rectilinear and extending parallel to said axis and being respectively arranged at positions which are mutually offset about said vertical axis by substantially the same angle by which said elements are mutually offset.

11. A device as claimed in claim 10, wherein the arm support is equipped with a yoke of magnetizable material having an inner substantially cylindrical wall, on which said plate elements are mounted each with its inner part-cylindrical surface in magnetically conducting contact with said wall, an outer cylindrical wall and a magnetically conducting end-wall element so connecting said outer cylindrical wall to said inner cylindrical wall as to provide between the outer part-cylindrical surfaces of said plate elements and said outer cylindrical wall a gap, in which said winding portions are accommodated.

12. A device as claimed in claim 2, wherein the anti-skating circuit includes anti-bias switch means operable to pass when the arm is in such playing position, anti-bias current through said winding in such direction and of such strength as to produce, in co-operation with the magnetic flux of said magnet means, a torque about said vertical pivot axis of such direction and magnitude as to substantially balance the skating torque produced by the action of the friction on a stylus, when such stylus on the pickup arm rests on a rotating record disc, with the leverage of said friction force from said vertical pivot axis.

13. A device according to claim 2, wherein said circuit means include a cueing switch operable to energize, when the pickup arm is in such raised position, said winding to produce, until the cueing switch is released, pivotal movement of the pickup arm towards the turntable centre.

14. A device as claimed in claim 13 which includes means operable at the start of a record-playing operation, to place the cueing switch in the closed position, and selectable stop means, operable at at least one predetermined position of the pickup arm about said vertical axis to restore the cueing switch to its open position.

15. A device as claimed in claim 12, wherein said circuit includes arm-level-responsive switching means operative when the arm is in its playing position to at least permit energization of the winding with such anti-bias current, but not with such motor current, and operative when the arm is in such raised position, to permit energization of the winding with such motor current but not with such anti-bias current.

* * * * *